(No Model.)
W. T. NORTON.
CURRY COMB.
No. 336,490. Patented Feb. 16, 1886.
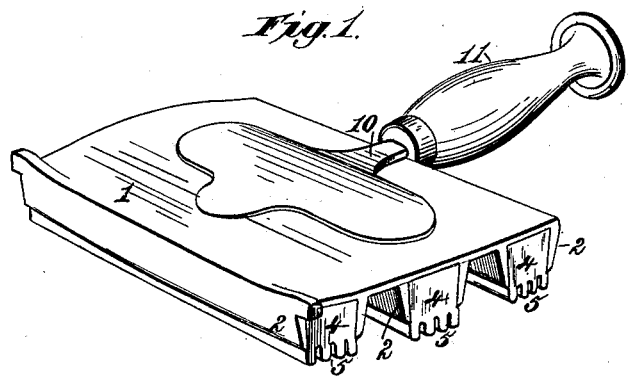
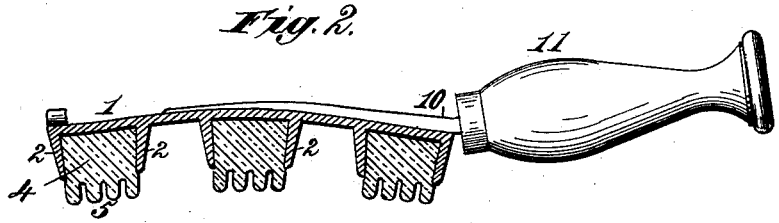
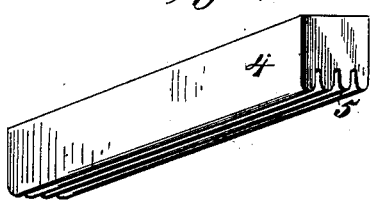 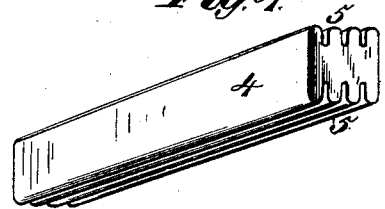
Witnesses,
Robert Pruitt
Geo. W. Rea.
Inventor.
William T. Norton.
By James L. Norris.
Atty.

UNITED STATES PATENT OFFICE.

WILLIAM TILTON NORTON, OF NEW BEDFORD, MASSACHUSETTS, ASSIGNOR OF ONE-HALF TO WILLIAM MARSHALL BATES, OF SAME PLACE.

CURRY-COMB.

SPECIFICATION forming part of Letters Patent No. 336,490, dated February 16, 1886.

Application filed March 19, 1885. Serial No. 159,613. (No model.)

*To all whom it may concern:*

Be it known that I, WILLIAM TILTON NORTON, a citizen of the United States, residing at New Bedford, Bristol county, Massachusetts, have invented new and useful Improvements in Curry-Combs, of which the following is a specification.

This invention relates to that class of curry-combs which are provided with flexible teeth of india-rubber; and it has for its object to combine simplicity and cheapness of construction with strength, durability, and efficiency in use, and provide effective means for the retention in a plate or holder of detachable blocks of india-rubber having continuous teeth formed thereon.

In a curry-comb heretofore devised and possessing flexible teeth, such teeth have been molded or formed with an india-rubber back, which renders the article too costly for use, since the teeth when worn down or otherwise rendered inoperative cannot be removed and replaced by new ones. Moreover, a curry-comb having elastic teeth formed integral with an elastic back or holder cannot be conveniently freed from gathered dirt by the ordinary action of knocking the comb against a hard surface. Curry-combs have also been provided with removable rubber teeth, or with removable rubbing-blocks composed of rubber or gutta-percha, such blocks being in some instances detachably inserted in metallic tubes or flanges attached to the comb-back, and secured therein by reason of said blocks being of unequal width, or widest next to the holder.

In my invention I combine the advantages of the flexible or pliable teeth of india-rubber with a solid or rigid back or holder, and also make provision for the retention of the elastic teeth in the holder or frame when said rubber teeth or blocks are of uniform width throughout, so that they can be retained without the aid of fastening-screws or other clamping devices, and I also render the elastic teeth capable of being readily removed when worn, in order to allow them to be replaced by new ones.

The invention, briefly outlined in the above statement, will hereinafter be more fully described, and then set forth in the claim.

In the accompanying drawings, Figure 1 is a perspective view of a curry-comb embodying my improvements. Fig. 2 is a longitudinal section of the same. Fig. 3 is a detail view of an elongated rubber block or strip having several continuous teeth formed on one of its faces. Fig. 4 is a detail view, showing such teeth formed on two opposite surfaces of the rubber block or strip. Fig. 5 is a detail view of the plate or holder for the toothed rubber blocks.

The reference-numeral 1 designates a plate which constitutes the back of the curry-comb and is made of metal or other rigid material. On the outer side of this plate are formed a series of parallel flanges, 2, which extend from side to side of the plate 1, and form channels or troughs 3, into which india-rubber blocks or strips 4, having teeth 5 formed thereon, are designed to be placed. These flanges 2 are generally slightly inclined or made tapering, so as to form channels or spaces 3, having a greater width at their inner ends adjoining the back plate, 1, so that the rubber blocks placed into said channels will be wedged into place. The rubber blocks or strips 4 are made of the same length as the channels 3, and one or two of their opposite faces are channeled throughout their entire length, so as to form continuous teeth or webs 5, which are pliable or elastic, as will readily be apparent. These blocks or strips 4, by their inherent elasticity, can be forcibly pressed into the channels in the back plate or holder, and retained therein by the expansion of the india-rubber against the walls of the channels. For this reason it is obvious that no special fastening devices are required to hold the toothed blocks in place, and that the curry-comb can be used in the manner of an ordinary comb without the liability of the rubber blocks being jarred out of place.

Although the rubber blocks are firmly held in their seats during the use of the comb, they can be readily drawn out of place when the teeth are worn or otherwise rendered inoperative, so as to allow new blocks to be inserted.

With the form of block seen in Fig. 4 continuous teeth are formed on two opposite sides of the rubber block, and hence the latter can be reversed when the teeth on one side are worn to present a new set of teeth for use, as will readily be apparent.

The rigid back plate of the comb is provided with the usual tang, 10, for attaching it to an ordinary handle, 11.

A curry-comb constructed as above set forth is both simple and cheap, and more desirable in use than the ordinary metallic comb, since it is not liable to scratch or worry the horse, and also does its work more thoroughly than the common comb. It is particularly useful when, in spring-time, it is desirable to remove old hair as soon as possible. Its action then is to completely remove the winter hair by reason of the clinging nature of the rubber. It is also much more rapid in its work than the old comb, because there are no vacancies in the teeth, the latter presenting continuous surfaces in which there are no gaps, as in the old comb. For this reason every portion of the surface enters into use.

Having thus described my invention, what I claim is—

A curry-comb consisting of the back or holder 1, provided with transverse oppositely-inclined flanges 2, forming channels 3, having their greatest width next to the holder, and the detachable india-rubber strips or blocks 4, of equal width throughout and provided with a series of longitudinal continuous teeth, said strips or blocks being held within their seats by their inherent elasticity, substantially as described.

In testimony whereof I affix my signature in presence of two witnesses.

WILLIAM TILTON NORTON.

Witnesses:
NATHAN B. MAYHEW,
SIMEON W. WEST.